Jan. 19, 1943.  A. Y. DODGE  2,309,051
TRANSMISSION CONTROL SYSTEM
Filed July 17, 1940  3 Sheets-Sheet 2

Inventor:
Adiel Y. Dodge,
By Dawson, Ooms & Booth,
Attys.

Jan. 19, 1943.  A. Y. DODGE  2,309,051
TRANSMISSION CONTROL SYSTEM
Filed July 17, 1940   3 Sheets-Sheet 3

INVENTOR.
ADIEL Y. DODGE
BY McConkey & Booth
ATTORNEYS.

Patented Jan. 19, 1943

2,309,051

UNITED STATES PATENT OFFICE 2,309,051

TRANSMISSION CONTROL SYSTEM

Adiel Y. Dodge, Rockford, Ill.

Application July 17, 1940, Serial No. 345,877

14 Claims. (Cl. 192—.01)

This invention relates to transmission control systems and more particularly to control systems for transmissions including hydraulic torque transmitting devices in combination with shiftable change speed elements.

One of the objects of the invention is to provide a transmission control system in which shifting of the transmission is facilitated by taking the load from the shiftable elements. This is preferably effected by power means controlled by a pedal or the like for braking one of the transmission members or for operating a clutch to interrupt the flow of torque through the transmission.

Another object of the invention is to provide a transmission control system including a brake for one of the transmission members to facilitate shifting in which engagement of the brake is prevented when the driving engine is turning above a predetermined speed.

Another object of the invention is to provide a transmission control system for vehicles including interlocking connections between the vehicle brakes, brake means for a transmission member to facilitate shifting and the engine throttle control to insure that the engine throttle is closed when either one of the brakes is engaged.

Still another object of the invention is to provide a transmission control system including a shift lever shiftable into a position to operate brake means for one element of the transmission to augment engine braking.

The above and other objects and advantages of the invention including novel sub-combinations and desirable structural features will be apparent from the following description of the embodiments shown in the accompanying drawings, in which.

Figure 1:
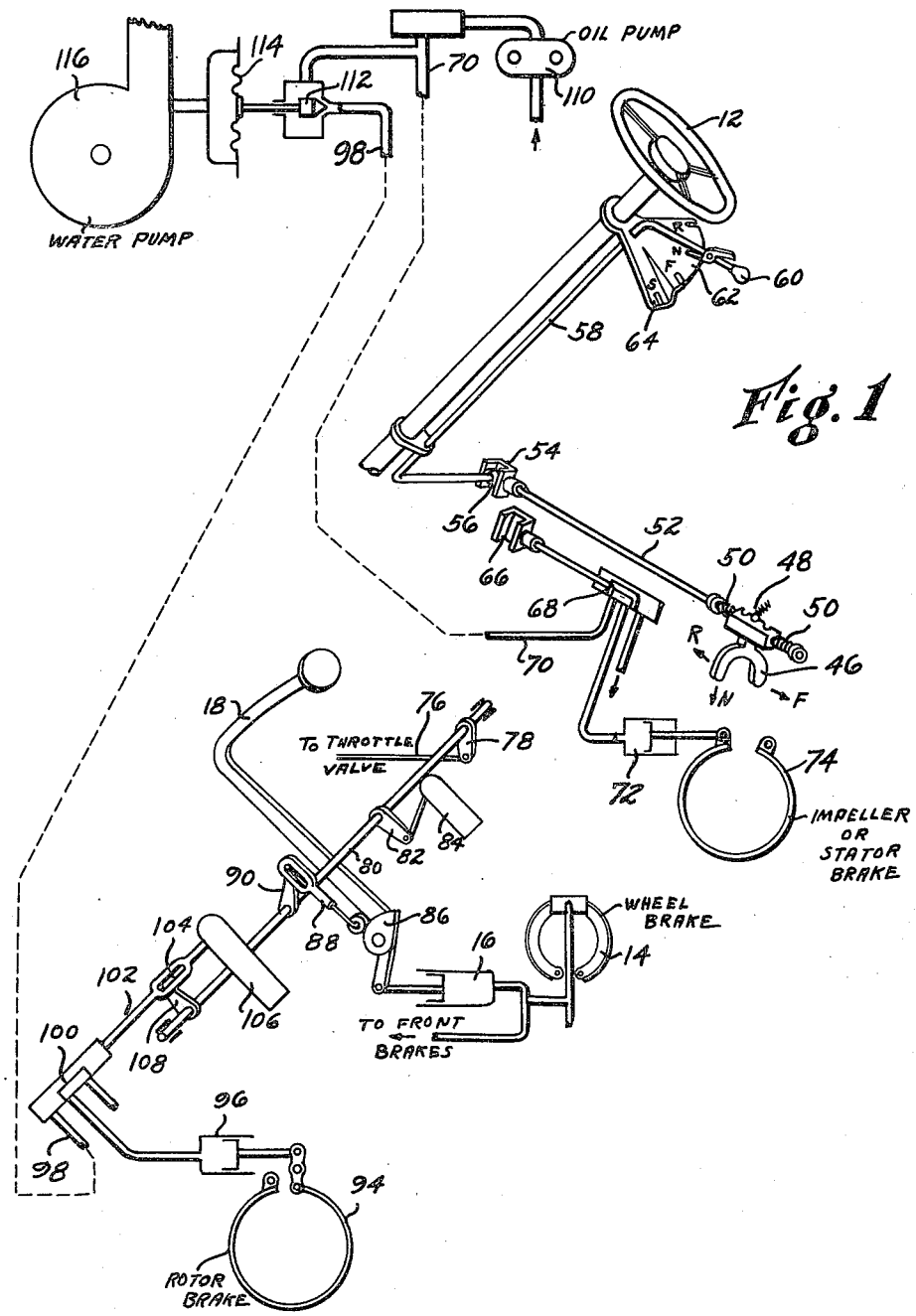
Figure 1 is a diagrammatic view of a transmission control system embodying the invention.
Figure 2:
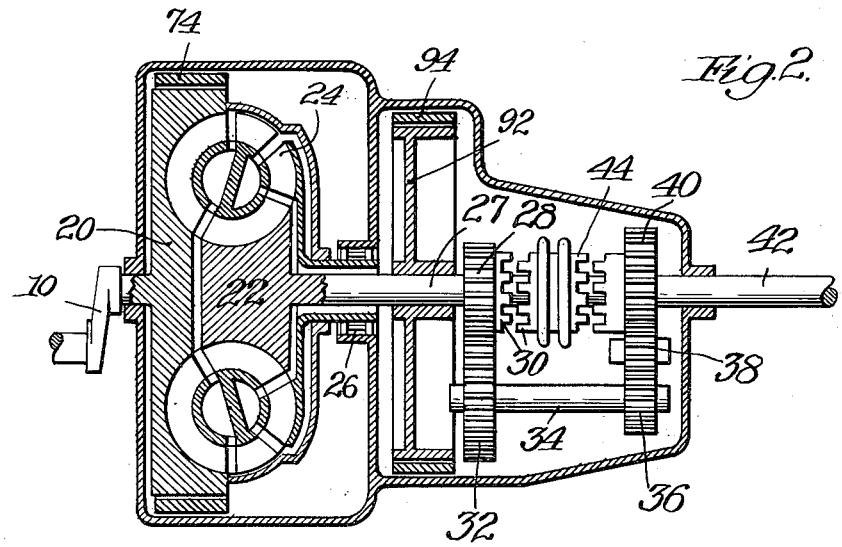
Figure 2 is a diagrammatic section of one type of transmission.

The control system illustrated in Figures 1 and 2 is of the type particularly adapted for engine driven vehicles having an engine not shown, but whose crankshaft is indicated at 10 in Figure 2. The engine is provided with road wheels steerable through a wheel 12 mounted in the driver's compartment of the vehicle and one or more of which have brakes 14. As shown, the brakes 14 are operated hydraulically by a master cylinder 16 connected through suitable piping to cylinders on the several wheels, the master cylinder being operated by a foot pedal 18 in the usual manner.

The engine is adapted to drive a transmission, one very simple form of which is indicated diagrammatically in Figure 2 as including a vaned impeller 20 connected to the crankshaft 10, a vaned rotor 22, and a vaned stator 24 mounted on a combined one way clutch and bearing 26 which permits its forward rotation, but prevents rearward rotation. This torque converter may take the form of any of the torque converters more particularly described and claimed in my Patent No. 2,190,830 or my copending applications Serial Numbers 3,544 filed January 26, 1935, or 95,117 filed August 10, 1936, which have eventuated in Patent Nos. 2,235,672 and 2,235,673, respectively dated Mar. 18, 1941. The rotor 22 is connected to a shaft 27 on which a gear 28 is rigidly mounted and formed on one side with clutch teeth 30. The gear 28 meshes with a gear 32 on a lay shaft 34 and a second gear 36 on the lay shaft meshes with a reverse idler 38 which drives a gear 40 rotatably mounted on a driven shaft 42. The transmission ratio is controlled by a shiftable clutch element 44 splined on an extension of the shaft 42 and formed with oppositely facing clutch teeth which may move into mesh either with the teeth 30 or with similar teeth on the gear 40. Preferably all of the clutch teeth are formed with a slight ejection angle to resist meshing when the elements to be connected are rotating relatively.

The clutch member 44 is adapted to be shifted by a yoke 46 held in one of three positions for reverse, neutral or forward by a spring detent 48 and shifted through springs 50 which connect it to a shift rod 52. The shift rod 52 carries at one end a yoke member 54 engaged by a ball 56 on the end of a control rod 58 terminating in a shift lever 60. The shift lever is movable over a segment 62 to shift the yoke 46 and the clutch member 44 to the neutral position as shown, or to the left for reverse drive or the right for forward drive.

The segment 62 is provided at one end with an offset portion 64 allowing the shift lever 60 to move the shaft 58 longitudinally to shift the ball member 56 into engagement with a second yoke member 66. It will be noted that the offset portion 64 is so located that the transmission is necessarily connected for forward drive when the shift lever 60 engages the offset 64. The yoke member 66 is connected to a pilot valve 68 controlling the admission of fluid from a line 70 into a cylinder 72 which operates a band brake 74 engageable with the impeller 20. This brake may be engaged to resist rotation of the impeller with the transmission in forward drive so as to supplement the braking effect of the engine when the vehicle descends a steep grade or the like. This same result may also be obtained in other ways, as explained in my copending application Serial No. 331,911 filed April 27, 1940, which has eventuated in Patent No. 2,277,214, dated Mar. 24, 1942.

The engine is controlled by the usual throttle valve not shown connected to a link 76 which is pivoted to an arm 78 on a shaft 80. A second arm 82 on the shaft is connected to the usual accelerator pedal 84 for controlling the engine speed.

In order to insure that the throttle valve is closed so as to operate the engine at minimum speed when the wheel brakes are applied the pedal 18 carries a cam 86 engaging a yoke 88 having an elongated slot therein receiving a pin on the end of arm 90 which is carried by the shaft 80. When the brake is released the accelerator pedal 84 may be operated in the usual manner to control the engine speed, the pin on arm 90 at this time sliding freely in the yoke 88. However, when the brake pedal 18 is depressed the end of the yoke 88 engages the pin and prevents rocking of the shaft 80 in a direction to open the throttle valve.

In order to facilitate shifting of the clutch element 44 means are provided for stalling the shaft 27 thereby to stall the clutch member. Since shifting is normally affected with the vehicle at rest, and since at this time both gears 28 and 40 are stationary, no relative rotation between the clutch teeth on the gears and the shiftable element can occur. As shown, the shaft 27 carries a brake drum 92 engaged by a band brake 94 operated by a fluid cylinder 96 receiving fluid from a line 98 under the control of a pilot valve 100. The pilot valve is connected to a rod 102 having an elongated slot 104 intermediate the ends thereof and connected to a foot treadle 106 which may be located in the position of the usual clutch pedal. When the treadle 106 is depressed the valve 100 will be opened to actuate the brake 94 through the fluid motor 96 thereby to stall the shaft 27.

In shifting the clutch element 44 under these conditions it may sometimes occur that the clutch teeth will meet squarely end to end and so will not move into engagement. However, due to the use of resilient springs 50 a constant pressure will be kept on the clutch teeth, and when the brake 94 is released the first small fraction of a revolution of shaft 27 will bring the teeth into register so that they may engage readily.

The slot 104 in rod 102 is provided to receive a pin on the end of an arm 108 which is carried by the shaft 80. In its released position the slot provides lost motion so that the arm 80 can be rocked for normal throttle operation, but when the treadle 106 is depressed the pin on arm 108 will engage the end of the slot 104 to insure that the throttle is in closed position.

Pressure fluid for operating the devices 72 and 96 may be provided from a pump or the like driven by the engine. As shown, the usual engine oil pump 110 is connected to the pipe 70 to the device 72 and past a valve 112 to the fluid conduit 98 for supplying oil under pressure to the device 96.

It would be highly undesirable to actuate the brake 94 with the engine operating at high speed since under these conditions heavy losses would be imposed and also undue wear of brake band 94. The valve 112 is provided to prevent this operation and is adapted to be closed above a predetermined engine speed. As shown, the valve is controlled through a diaphragm 114 connected to the outlet of the usual engine water pump 116 so that when the engine is operating at a predetermined high speed the diaphragm 114 will close the valve 112 and prevent the admission of oil pressure to the motor 96. Below the predetermined engine speed the valve 112 will open and the rotor brake 94 may be operated as described above.

Figure 5:
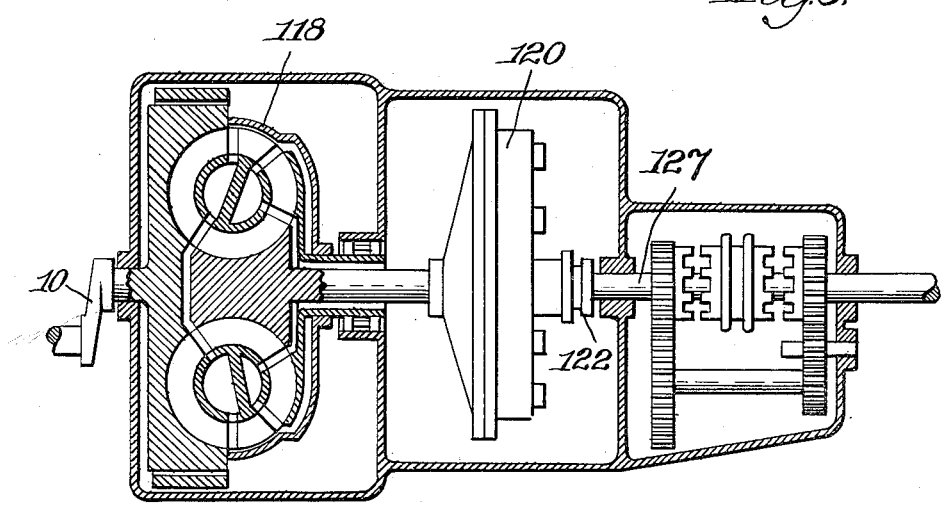
Figure 5 is a diagrammatic view of a transmission for use with the control system of Figure 4.
Figure 3:
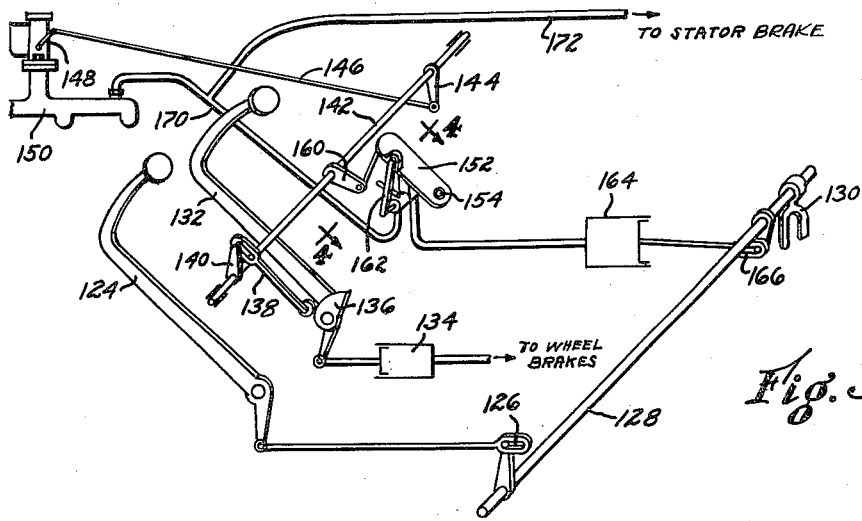
Figure 3 is a diagrammatic view of another control system.
Figure 4:
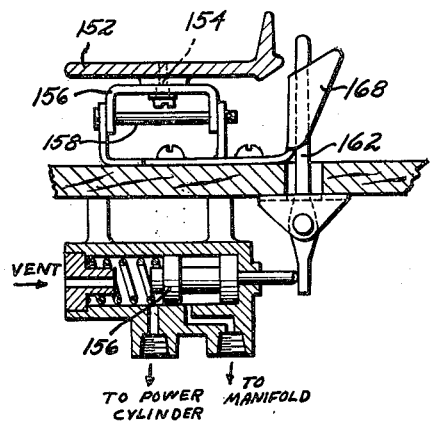
Figure 4 is an enlarged section on the line 4—4 of Figure 3.

Figures 3 and 4 illustrate a control system certain features of which may be utilized in the place of corresponding features of the system of Figure 1, but is illustrated for use in connection with a transmission of the type shown in Figure 5. This transmission includes a hydraulic torque converter indicated generally at 118 connected through a friction clutch 120 having a throw out collar 122. The clutch is connected to a shaft 127 corresponding to the shaft 27 of Figure 2 and driving through a gear train illustrated as identical with the gear train of Figure 2.

As shown in Figure 3 a conventional clutch pedal 124 is connected through a lost motion connection 126 to a rock shaft 128 which is in turn connected to a yoke 130 adapted to engage the clutch throw out collar 122. A brake pedal 132 is connected to a master cylinder 134 and carries a cam 136 operating a yoke 138 having lost motion connection with an arm 140 on a rock shaft 142. The rock shaft 142 is connected through an arm 144 and link 146 to the engine throttle indicated at 148 to control the inlet of air and fuel mixture to the engine manifold 150. The throttle is controlled by a treadle 152 best seen in Figure 4 as pivoted about a vertical pivot 154 to a yoke 156 which is horizontally pivoted at 158. The treadle 152 is linked by an arm 160 to the shaft 142 for rocking the same to control the throttle 148.

A lever 162 is pivoted beside the treadle 152 in a position to be engaged thereby when the treadle is swung sideways about the pivot 154 to control a pilot valve 156. The pilot valve 156 controls fluid connections to a fluid motor 164 which is connected through a lost motion link 166 to the clutch shaft 128. Through this mechanism the clutch 120 may be operated in the usual manner by the pedal 124 or may be operated through the fluid device 164 by swinging the treadle 152 horizontally about its pivot 154. One of the chief uses for the double action of this accelerator pedal is to conveniently open the clutch to eliminate the creeping inherent in fluid driven vehicles. This action may also be conveniently performed in lieu of depressing the usual clutch pedal during shifting or the like to facilitate engagement of the tooth members in the transmission in place of using a rotor brake such as 94.

Preferably disengagement of the clutch under the control of the treadle 152 is prevented except when the treadle is in its uppermost or closed throttle position. For this position a guard plate 168 is mounted adjacent the lever 162 to block engagement of the treadle with the lever except when the treadle is in its uppermost position.

The motor 164 of Figure 3 may be operated by oil pressure as illustrated in Figure 1, but is shown as being a vacuum operated motor connected through the valve 156 to the manifold 150 by a pipe 170. The pipe 170 is shown provided with a branch 172 which may lead an actuating motor such as 72 of Figure 1 to energize a brake for the impeller or stator of the hydraulic torque converter 118 to augment the usual engine braking effect.

Figure 6:
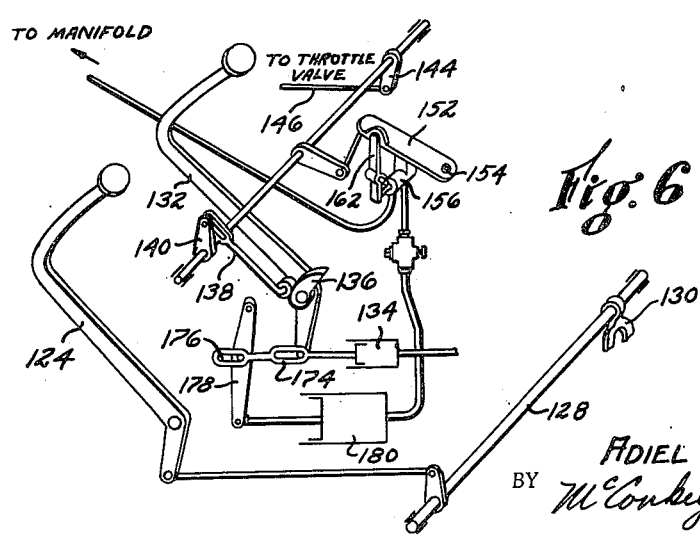
Figure 6 is a diagrammatic view of another control system.

Figure 6 illustrates a slightly modified construction identical in many respects to that of Figure 3, and parts therein corresponding to like parts in Figure 3 are indicated by the same reference numerals. As shown in this construction the brake pedal 132 is connected through a lost motion connection 174 to the master brake cylinder 134 and a similar lost motion connection 176 is provided between the master cylinder and a lever 178 pivoted at one end to a fixed part of the vehicle. The opposite end of the lever 178 is connected to a vacuum motor 180 which is connected through the valve 156 to the engine manifold.

In this construction the wheel brakes may be operated in the usual manner by depressing the brake pedal 132 or by moving the treadle 154 sideways to open valve 156 and the fluid motor 180 will be energized to operate the wheel brakes. This construction is of particular advantage in preventing any tendency of the vehicle to creep when idling and permits the wheel brakes to be held engaged with a minimum of effort.

While several embodiments of the invention have been shown and described it will be understood that these are illustrative only and that the invention is not intended to be limited thereto nor otherwise than by the terms of the appended claims.

What is claimed is:

1. A control system for a transmission having shiftable means to change the driving connections and a hydraulic torque transmitting device comprising a shifting member, resilient connections between the shifting member and shiftable means, and brake means to hold the driven member of said torque transmitting device to facilitate shifting of said shiftable means.

2. A control system for a transmission having shiftable means to change the driving connections and a hydraulic torque transmitting device connected to a driving engine comprising a shift lever, resilient connections between the shift lever and the shiftable means, brake means to hold the driven member of the torque transmitting device, a control lever for the brake means, a control lever for the engine throttle, and connections between said control levers to insure that the engine is at minimum speed when the brake means is engaged.

3. A control system for a transmission having shiftable means to change the driving connections and a hydraulic torque transmitting device connected to a driving engine comprising brake means for braking one member of the hydraulic torque transmitting device, actuating means for the brake means, and means responsive to the speed of the engine for making the actuating means ineffective above a predetermined engine speed.

4. A control system for a transmission having shiftable means to change the driving connections and a hydraulic torque transmitting device connected to a driving engine comprising brake means for braking one member of the hydraulic torque transmitting device, a fluid pressure device for actuating the brake means, and means responsive to the speed of the engine for cutting off the admission of fluid pressure to said device.

5. A control system for a transmission having shiftable means to change the driving connections and a hydraulic torque transmitting device comprising a shift lever connected to said shiftable means, brake means for braking one member of the hydraulic torque transmitting device, and control means for the brake means engaged by the shift lever in one position thereof to apply the brake means.

6. A control system for a transmission having shiftable means to change the driving connections and a hydraulic torque transmitting device comprising a shift lever connected to said shiftable means, brake means for braking one member of the hydraulic torque transmitting device, a fluid pressure operated device for controlling the brake means, a valve for controlling said device, and operating means for the valve engaged by the shift lever in one position thereof to control the brake means.

7. A control system for an automotive vehicle having a driving engine and road wheels provided with brakes and a transmission connecting the engine and road wheels and including shiftable means for changing the driving connections comprising a shift lever connected to the shiftable means, brake means engaging one member of the transmission to facilitate shifting, a control lever for said brake means, a control lever for the engine, a control lever for the wheel brakes, and interlocking connections between said control levers to insure that the engine is at minimum speed when either of the brake means is engaged.

8. A control system for an automotive vehicle having a driving engine and road wheels provided with brakes and a transmission connecting the engine and road wheels and including shiftable means for changing the driving connections comprising a shift lever connected to the shiftable means, brake means engaging one member of the transmission to facilitate shifting, a control lever for said brake means, a control lever for the engine, a control lever for the wheel brakes, interlocking connections between said control levers to insure that the engine is at a minimum speed when either of the brake means is engaged, and means responsive to the speed of the engine to prevent actuation of the brake means for a member of the transmission when the engine is running above a predetermined speed.

9. A control system for a transmission including a driving part driven by an engine and shiftable means to change the transmission driving connections comprising a pedal connected to the engine and swingable about a pivot in one plane to control the engine speed, means associated with said transmission to facilitate shifting of said shiftable means, and control means for said last named means operable by said pedal when it is swung about a pivot in another plane.

10. A control system for a transmission including a driving part driven by an engine and shiftable means to change the transmission driving connections comprising a pedal connected to the engine and swingable about a pivot in one direction to control the engine speed, means associated with said transmission to facilitate shifting of said shiftable means, and control means for said last named means operable by said pedal when it is swung about a pivot in another direction, and means to prevent movement of the pedal in said other direction unless it is in a position to reduce the engine speed to a minimum.

11. A control system for a transmission including a driving part driven by an engine and shiftable elements to change the transmission driving connections comprising a pedal connected to the engine and swingable about a pivot in one plane to control the engine speed, a clutch connected to the transmission to interrupt the drive therethrough, power means for operating the clutch, and control means for the power means connected to be controlled by swinging of said pedal about a pivot in another plane.

12. A control system for a transmission including a shiftable toothed member shiftable into mesh with another toothed member, said control system comprising a shift lever, yieldable means connecting the shift lever to said shiftable member, and means for braking one of said toothed members during shifting.

13. A control system for an engine driven transmission including a shiftable element to vary the transmission driving connections comprising means for shifting said shiftable element, brake means for braking one member of the transmission to facilitate shifting, means responsive to engine operation to supply power for operating the brake means, and a second means driven by the engine and responsive to the speed thereof to prevent the supply of power to the brake means when the engine is running above a predetermined speed.

14. A control system for an engine driven transmission including a shiftable element to vary the transmission driving connections comprising means for shifting said shiftable element, brake means for braking one member of the transmission to facilitate shifting, means responsive to engine operation to supply power for operating the brake means, said engine including a water circulating pump, and means responsive to the pressure developed by said pump to prevent the supply of power to the brake means.

ADIEL Y. DODGE.